United States Patent
Pfeuti et al.

(10) Patent No.: US 11,301,079 B2
(45) Date of Patent: Apr. 12, 2022

(54) METHOD AND DEVICE FOR DETERMINING THE POSITION OF AN OBJECT ON A GIVEN SURFACE

(71) Applicant: The Swatch Group Research and Development Ltd, Marin (CH)

(72) Inventors: Jean-Nicolas Pfeuti, Hauterive (CH); Arnaud Casagrande, Bôle (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/950,077

(22) Filed: Nov. 17, 2020

(65) Prior Publication Data

US 2021/0191559 A1    Jun. 24, 2021

(30) Foreign Application Priority Data

Dec. 20, 2019 (EP) .................................... 19218765

(51) Int. Cl.
*G06F 3/041* (2006.01)
*G06N 20/00* (2019.01)
(Continued)

(52) U.S. Cl.
CPC .......... *G06F 3/0416* (2013.01); *G06F 3/0448* (2019.05); *G06F 3/04883* (2013.01); *G06N 20/00* (2019.01)

(58) Field of Classification Search
CPC .. G06F 3/0416; G06F 3/0448; G06F 3/04883; G06N 20/00
See application file for complete search history.

(56) References Cited

U.S. PATENT DOCUMENTS

2012/0166145 A1    6/2012    Kent
2012/0274609 A1*  11/2012    Sheng ................... G06F 3/0436
                                                            345/177
(Continued)

FOREIGN PATENT DOCUMENTS

JP    2013-542535 A    11/2013
WO    2005/026938 A2    3/2005
(Continued)

OTHER PUBLICATIONS

European Search Report for EP 19 21 8765 dated Jul. 9, 2020.
Office Action dated Nov. 2, 2021 in Japanese Application No. 2020-199991.

*Primary Examiner* — Sahlu Okebato
(74) *Attorney, Agent, or Firm* — Sughrue Mion, PLLC (57) ABSTRACT

A method for detecting the presence and/or determine a position of an object on a measurement surface of an electronic device. The process includes: providing oscillating signal(s) at input points which are different and spaced from the array of electrodes in a detection area of the measurement surface; receiving oscillating signal(s) having passed through the array, which defines a transfer function of the signals, in output point(s) which are different and spaced from the array of electrodes in a detection area of the measurement surface; measuring a coupling or an attenuation induced by the presence on one or more oscillating signals passing through the array of electrodes of an object placed on the measurement surface in order to determine the position of the object in the detection area of the measurement surface depending on the modification of the transfer function of the array of electrodes.

22 Claims, 6 Drawing Sheets

(51) Int. Cl.
*G06F 3/044* (2006.01)
*G06F 3/04883* (2022.01)

(56) References Cited

U.S. PATENT DOCUMENTS

| | | | |
|---|---|---|---|
| 2013/0076374 A1* | 3/2013 | Huang | G06F 3/04182 |
| | | | 324/618 |
| 2014/0118307 A1* | 5/2014 | Berget | H03H 9/02535 |
| | | | 345/177 |
| 2014/0152624 A1 | 6/2014 | Piot et al. | |
| 2014/0267155 A1 | 9/2014 | Aubauer et al. | |
| 2016/0077665 A1 | 3/2016 | Paek | |
| 2018/0275831 A1 | 9/2018 | Christiansson et al. | |

FOREIGN PATENT DOCUMENTS

| WO | 2012/061956 A1 | 5/2012 |
|---|---|---|
| WO | 2014/200736 A1 | 12/2014 |
| WO | 2019/191126 A1 | 10/2019 |

\* cited by examiner

METHOD AND DEVICE FOR DETERMINING THE POSITION OF AN OBJECT ON A GIVEN SURFACE

CROSS-REFERENCE TO RELATED APPLICATION

This application claims priority to European Patent Application No. 19218765.6 filed on Dec. 20, 2019, the entire contents of which are incorporated herein by reference.

TECHNICAL FIELD OF THE INVENTION

The invention relates to a method for detecting the presence and/or determining the position of at least one object on a given measurement surface of an electronic device.

The invention also relates to an electronic device for detecting the presence and/or determining the position of at least one object on a measurement surface for the implementation of the method.

PRIOR ART

Detecting a position of an object, such as a users finger on a screen, such as a touchscreen, is well known. Several technologies can be used for this purpose. These technologies are based for example on the measurement of an electrical resistance or capacitance, or also on the interruption, that is to say, the masking, of light rays or on the attenuation of surface waves, such as ultrasound.

These technologies can be classified into two categories. One of the categories is based on a discrete segmentation of the given measurement surface, and another category is based on a linear variation of a magnitude along two axes X, Y. Capacitive sensor systems and those based on light fall generally in the discrete segmentation category. All capacitive touch screens, for example, are made either of an array of rows and columns which intersect without contact by being separated by an insulating layer, or of a set of discrete ranges each individually connected to a detection circuit. Generally in the prior art, light-based systems also use light sources and sensors disposed opposite each other, constituting an array of rows and columns. In these aforementioned systems, it is the activation information of a discrete range or an intersection between a column and a row that gives the position. Resistive or surface wave technology screens use linear variation, measured along two orthogonal axes, to determine the contact position.

In the case of a capacitive type touch screen, consisting of an array of electrodes, the detection of the activation of a touch key is based on a measurement of the modification in frequency of the signal by connection to an oscillator as described in patent EP 1 324 162 B1. This does not allow the touch screen to be used in any environment likely to modify this frequency, for example underwater, before the activation of the key(s) by a finger on the touch screen. It is possible to vary or modulate the frequency of the signal at each electrode to more reliably detect the activation of a touch key, but the identification of such activation requires a processing which is little more substantial for the watch processor, which does not reduce the desired energy consumption.

With an array of capacitive touch electrodes broadcasted on the glass (Indium Tin Oxide), it is always necessary to connect each capacitive sensor electrode by a connection track to a measurement circuit. As also each connection track is of a certain width, the arrangement of these different connection tracks inevitably poses the problem of wasted space and sometimes with one or two insulation layers for the passage of the connection tracks between the electrodes of the touch keys and the measurement circuit. In addition, several parasitic or ground capacitors are present through these electrical connections, and the measurement circuit must take this into account by defining and calibrating for the various measurements, the disturbances induced by each parasitic capacitor. This complicates the arrangement of such an array of capacitive electrodes.

Patent application EP 0 838 737 B1 describes a set of capacitive sensor electrodes disposed close to one another under a watch glass. Each electrode is connected by an electrical conductor to a measurement circuit. Thus, as mentioned above, all the electrodes are connected by an electrical conductor, which poses a problem of wasted space in the watch case and, in addition, several parasitic or ground capacitors are present.

SUMMARY OF THE INVENTION

The purpose of the invention is therefore to overcome the disadvantages of the prior art by providing a method for detecting the presence and/or determining the position of at least one object on a measurement surface of an electronic device, by an analysis of the influence of the object on oscillating signals which pass through a propagation conducive medium, and without a congestion of a large number of electrical connections of the electronic device.

To this end, the invention relates to a method for detecting the presence and/or determining at least one position of at least one object on or near a measurement surface of an electronic device, which comprises the features defined in the independent claim 1.

Particular steps of the method are defined in the dependent claims 2 to 10.

An advantage of the method lies in the fact that the oscillating signal propagation medium defines a transfer function of the oscillating signals varying depending on the position of an object, such as a finger, on a measurement surface of the electronic device. A coupling or an attenuation induced by the presence of at least one object, such as a finger, on or near the measurement surface is thus measured by the output points of a measurement circuit to determine the position of the object. The output signal can be digitised and controlled relative to memorized position parameters, in particular following a learning phase with a computer machine for learning the determined positions. It can be a propagation medium, which is a glass of a portable instrument with light beams reflected between an upper measurement surface and a lower surface. In the case of an ultrasonic signal, for example with a surface wave, the propagation medium can also be the measurement surface on a watch glass or through the thickness of the glass by piezoelectric electrodes disposed on a lower surface or an upper surface of the watch glass.

Advantageously, the measurement circuit of the electronic device remains the same in any type of electronic device without influence on the shape, the dimensions of the propagation medium and of the detection area on the measurement surface. The learning and configuration phase of the measurement circuit is identical using electrical or optical or ultrasonic or electromagnetic oscillating signals. Such an electronic device can easily equip any type of portable instrument, such as for example an electronic or electromechanical watch.

Advantageously, if the propagation medium is an array of capacitive sensor electrodes, this is no longer based on segmentation into rows and columns, nor on discrete areas, but rather on the variation of a propagation function along a given axis. Several electrodes are left in a floating state without direct connection by conductive tracks to the measurement circuit, because only some electrodes at the periphery of the array of electrodes in matrix form are connected by conductive tracks for providing oscillating signals at the input and receiving signals to be measured at the output.

Advantageously, the electronic device with a capacitive array of electrodes can be integrated into an electronic or electromechanical watch.

Advantageously, the propagation medium can be a glass of a portable instrument for light beams reflected between an upper measurement surface and a lower surface.

Advantageously, the propagation medium can be the measurement surface of a glass or through the glass to transmit an ultrasonic signal, for example with a surface wave, by piezoelectric electrodes disposed on a lower surface or an upper surface of the glass.

Advantageously, the electronic device can be configured following a learning phase in such a way as to recognise a signature of a person or the recognition of a character drawn on the measurement surface. For this purpose, any movement of the finger on the measurement surface is determined with the time component and with configuration parameters taking into account the values X and Y, as well as the time component.

To this end, the invention also relates to an electronic device for implementing the method for detecting the presence and/or determining at least one position of an object on a measurement surface, which comprises the features defined in the independent claim 11.

Particular embodiments of the electronic device are defined in the dependent claims 12 to 22.

BRIEF DESCRIPTION OF THE FIGURES

The invention will be described in more detail below using the appended drawings, given by way of non-limiting examples, wherein.

BRIEF DESCRIPTION OF THE FIGURES

In the following description, all the components of an electronic device used for detecting the presence and/or determining the position of at least one object on a given measurement surface, which are well known to a person skilled in the art in this technical field, are only described in a simplified manner.

Figure 1:
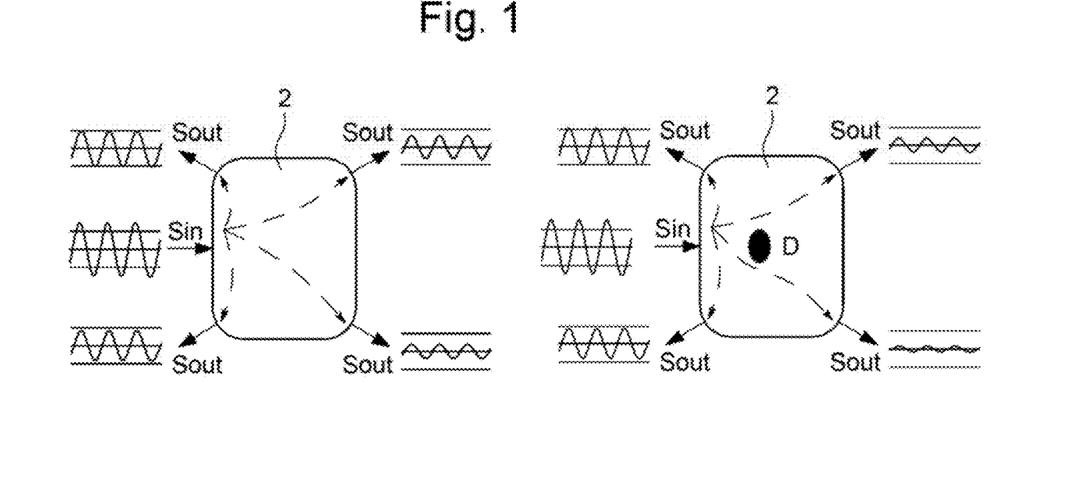
FIG. 1 partially shows an electronic device for detecting the presence and/or determining the position of at least one object on a given measurement surface by means of the principle of variation of oscillating signals passing through a propagation medium, which defines a transfer function of the oscillating signals according to the present invention.

FIG. 1 partially shows an electronic device in particular for implementing the method for detecting the presence and/or determining the position of at least one object D on or near a given measurement surface of the electronic device. On the left side of FIG. 1 no object is present, while on the right side of FIG. 1 an object D is placed on or near a position of the measurement surface in a detection area of the electronic device. Preferably, the electronic device can equip a portable instrument, such as an electronic or electromechanical watch.

At least one oscillating signal Sin is provided to at least one input point of a first part of an oscillating signal propagation medium 2. Each oscillating excitation signal can be at a frequency of the order of 400 kHz without necessarily being limited to this value. The propagation medium 2 defines a transfer function for the oscillating signal(s) so that the amplitude or any other measurable property of the oscillating signal(s) depends on the local properties of this medium. The oscillating signal Sin can pass through the propagation medium 2 and be received or picked up at one or more output points Sout which are different and spaced from a second part of the propagation medium 2 in a detection area of the measurement surface.

In this FIG. 1, four output points Sout disposed in four angles of the propagation medium 2 are shown to cover an entire detection area of the measurement surface, but without limitation to more or less output points of the output measurement signal Sout. A coupling or an attenuation induced by the presence of at least one object D, such as a finger, on or near the measurement surface, as shown on the right side of FIG. 1, is thus measured by the output points on the oscillating signal passing through the medium. Note that the oscillating output signals Sout on the right part of the right side of FIG. 1 have a reduced amplitude compared to those of the right part of the left side of FIG. 1. On the other hand, the oscillating output signals Sout on the left part of the right side and the left side of FIG. 1 vary in amplitude relative to the oscillating input signal Sin, but do not vary with or without the object D on the measurement surface. Thus, the influence of the object D on the oscillating signals transferred from left to right by the modification of the transfer function of the medium can be noted.

As indicated above, an attenuation of the oscillating signal can also be measured in the electronic device even without the presence of the object on the measurement surface. In this case, the attenuation of the oscillating signal, that is to say the reduced amplitude of said oscillating signal picked up, depends on the distance between the input point of the oscillating signal Sin and the output point for the signal Sout to be measured.

It should be noted that the oscillating signal, such as a reference oscillating signal, can be an electrical signal, or an optical signal, or an ultrasonic signal (surface wave or the like), or an electromagnetic signal. The oscillating signal can also be a signal created by mixing ultrasonic pressure wave and local electrical or optical features (electrical capacitance modulated by variations in thickness related to the propagation of the ultrasonic wave, or modulated optical FTIR coupling by the surface angle of the ultrasonic wave). In the case of an optical signal, the propagation medium can be directly the watch glass with light beams reflected between an upper surface, which is a measurement surface, and a lower surface. In the case of an ultrasonic signal, for example with a surface wave, the propagation medium can also be the measurement surface on a watch glass or through the thickness of the glass by piezoelectric electrodes disposed on a lower surface or an upper surface of the watch glass.

Thanks to the different measurement output points of the modified oscillating signal Sout during its path in the propagation medium 2, a measurement circuit, not shown in FIG. 1, of the electronic device is able to determine the position of the object D in the detection area of the measurement surface depending on the modification of the medium transfer function. However, as the electronic device is possibly intended to equip an electronic or electromechanical watch with low energy consumption, a phase of learning the different positions of the object D on or near the measurement surface can be carried out by a learning machine or apparatus in communication with the electronic device. In the case of a possible subsequent learning phase, which is subsequent to the product manufacturing phase, a wireless communication can be imagined, with the purpose of simplifying the user interface and allowing dedicated learning to a given user. Use can be made of a mobile phone ("smart-phone"), with an adapted program guiding the user for example on different patterns to be performed on the touch sensor, that is to say on a measurement surface.

This learning phase allows to determine exact positions in X and Y of the object D on the measurement surface by the learning machine (using for example a robotic positioning system to precisely define positions XY) following different positions depending on the oscillating signals measured in the measurement circuit on which the object D is located and transmitted to the learning machine. The different values in X and Y of the different positions on the measurement surface determined by the learning machine are transmitted and memorized in a memory of the electronic device. Once past this learning phase, the electronic device can easily perform a subsequent determination of the positions of any object placed on or near the measurement surface.

Of course, provision can be made to provide several oscillating signals Sin at different input points spaced from the first part of the propagation medium 2 so as to be received by one or more output points Sout of the second part of the propagation medium 2 for the measurement of a position of the object D on the measurement surface. The different input points of the oscillating signals or the different output points are spaced apart to allow good distribution, preferably at the periphery of the propagation medium 2 so as to precisely determine any position of the object in the detection area of the measurement surface by the measurement circuit. This detection area is normally defined between the input and output points or also encompassing them. The presence of the object, such as a finger, on the measurement surface affects the local properties of the propagation medium 2, inducing some modifications of the properties of the received signal relative to its location.

In the remainder of the description, reference will only be made to a propagation medium, which is in the form of an array of capacitive sensor electrodes for a touch screen of the electronic device. This array of electrodes is generally disposed under a non-conductive support or a non-conductive protective screen, for example in connection with a watch glass. However, any other propagation medium can be considered depending on the type of oscillating signal used for measuring the position of the object on the measurement surface. Also, the various measurements related to the transfer function of the medium used can be the phase, the amplitude, or else the time of flight of the signal in the medium.

Figure 2:
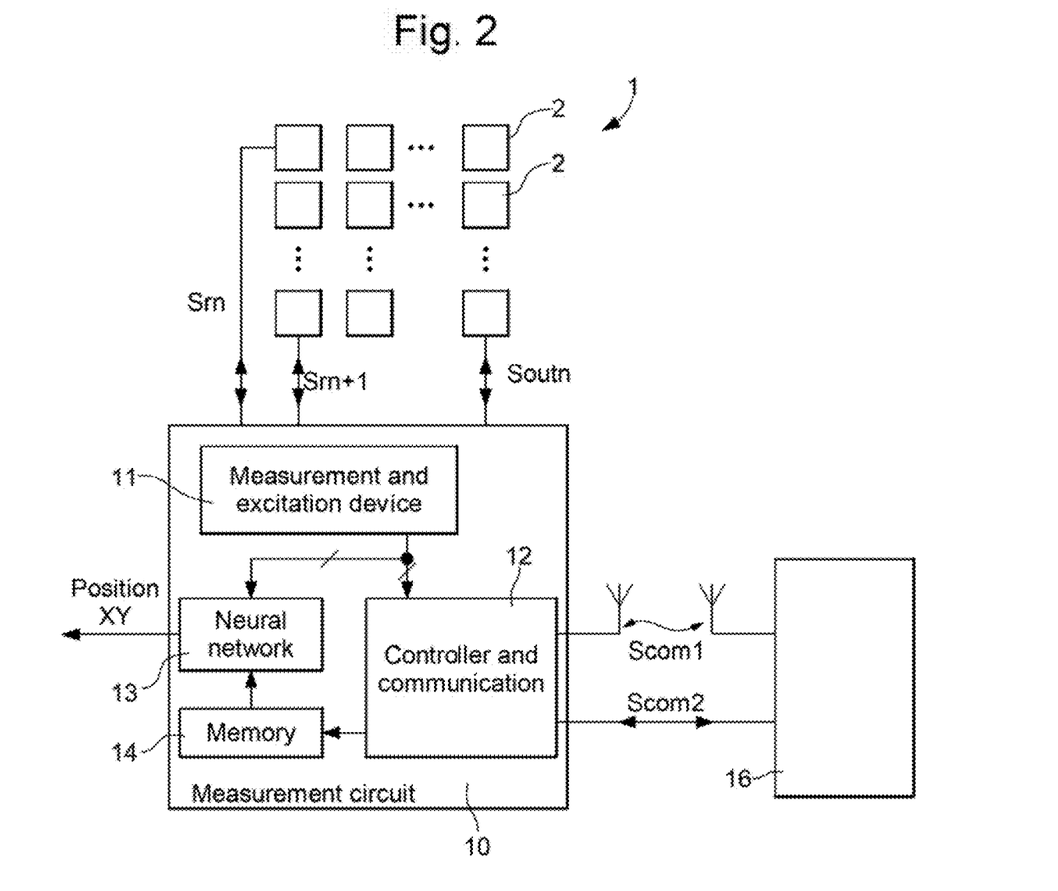
FIG. 2 represents an embodiment of an electronic device having an array of capacitive sensor electrodes in matrix form connected to a measurement circuit for determining the position of at least one object on a given measurement surface according to the invention.

FIG. 2 shows an embodiment of an electronic device 1 consisting of an array of capacitive sensor electrodes 2 defining the oscillating signal propagation medium, which is connected to a measurement circuit 10. According to this new detection concept, this array of electrodes 2 in matrix form no longer consists of a set of discrete measurement points, but rather as a discrete or continuous matrix where only several distinct points are measured. This array of electrodes is in the form of a checkerboard with the electrodes 2 neatly grouped together and finely spaced from each other.

Instead of measuring a local capacitance value to determine a position, the new electrode array 2 linked to the measurement circuit 10 operates with the overall measurement of the transmission properties relative to a set of possible paths. The presence of the finger as object affects the local properties of the propagation medium, by inducing certain modifications of the properties of the oscillating signal received on the various outputs.

The electrode array 2 therefore comprises a major part of the capacitive electrodes 2, which are of the floating type, that is to say without being connected by conductive tracks to the measurement circuit 10 or to the neighbouring electrodes. Only some electrodes, normally those at the periphery of the electrode matrix, are used to receive one or more oscillating input signals Sm, Srn+1 and to provide one or more measurement signals at the output Soutn to determine the position of an object placed on the array of electrodes by the measurement circuit 10. Only the tracks for connection to the electrodes 2 used for measurement are connected to the measurement circuit 10.

As shown in this embodiment of FIG. 2, the different excitations and measurements can be swapped at the different input and output ports. At a given time, provision is made of two oscillating input excitation signals Srn and Srn+1, each provided to a respective electrode 2 while being sufficiently spaced from each other. These two electrodes 2 are located at the periphery of the first part of the oscillating signal propagation medium. Preferably, provision is made of a first oscillating excitation signal Sm, which is an analogue wideband signal, and a second oscillating excitation signal Srn+1, which is an analogue orthogonal signal. Therefore, the way the input signal(s) propagate in the transfer medium to the outputs of the array of capacitive electrodes, but here to an output electrode 2 to provide the measurement signal Soutn, can be seen. This output electrode 2 is located in the second part of the propagation medium and preferably well distant from the two input electrodes in order to be able to cover a large part of the detection area of the measurement surface of the electronic device 1. The triangle connecting the electrodes 2 of the input Sm, Srn+1 and output Soutn signals covers part of the detection area. The measurement circuit 10 must be responsible for detecting on the one hand the presence of at least one object on or near the measurement surface and also for determining a position of the object on the array of electrodes.

The reference Sm instead of Sr1 and the reference Srn+1 instead of Sr2 were given voluntarily for the excitation signals, because a larger number of excitation signals can be considered. The same is true for the reference of the output measurement signal Soutn instead of Sout, since a larger number of output measurement signals can be considered.

The measurement circuit 10 essentially comprises, for providing the excitation signals Sm and Srn+1 and receiving the output signal(s) Soutn, a measurement and excitation device 11. The measurement circuit 10 also comprises a neural network 13 receiving the successive measurement signals from the measurement and excitation device 11 to determine the positions X and Y of an object on the measurement surface. However, for the measurement device 1, an initial phase of learning the positions of an object on the measurement surface is carried out beforehand. For this purpose, the measurement circuit 10 comprises a communication controller 12 to communicate by wireless data signals Scom1 or by data signals Scom2 for direct connection to a learning machine 16.

As explained below, the determination of the exact position of the object, for example a finger, on the array of electrodes 2 is performed by training a neural network by the computer machine 16 to define positions in X and Y of the array on which the finger is located. Subsequently, the exact position of the finger is then determined by the neural network 13 contained in the measurement circuit 10, in response to several measurement signals Sout digitised with the variations of each output signal taken into account according to the position on the array of a finger. The different values in X and Y of the different positions on the measurement surface determined by the learning machine 16 are transmitted and memorized in a memory 14 of the measurement circuit 10. This memory 14 can be a FLASH type memory, which provides when determining the position of the neural network 13, synaptic weights in relation to the values in X and Y transmitted by the learning machine 16.

It should be noted that the electronic device 1 may also be able to give an additional output value, which represents for example the angle of inclination of the finger on the electrode array matrix. In addition, provision is also made to be able to determine over time the movement of the finger D on the measurement surface of the electronic device 1 in order to produce a signature or alphabetical characters as explained below at the end of the description. In this case and after the learning phase, the time must be taken into account to determine a trace on the measurement surface in the electronic device 1. Thus in addition to the different values in X and Y of the positions of the object on the measurement surface transmitted by the learning machine and memorized in a memory of the electronic device 1, a value of time or period of the movement of the finger on the measurement surface must be learned by the electronic device 1. The device may comprise a time base or an oscillator for timing operations.

The electronic device 1 is provided, for example, to equip a watch, such as an electronic or electromechanical wristwatch, and the electrode array 2 can be disposed under a non-conductive protective screen, not shown, the upper surface of which is used as a measurement surface of the electronic device 1. Preferably, the array of transparent electrodes 2 on glass (produced for example by Indium Tin Oxide diffusion) can be disposed directly under a watch glass or also under a transparent protective screen of small thickness mounted on the watch glass as indicated in patent EP 2 988 180 B1 incorporated here with reference to FIG. 2, paragraphs [0028] and [0029].

In FIG. 2, the electronic device 1 can also comprise, in the measurement circuit 10, a controller 12 for communicating data signals Scom1 or Scom2. This controller 12 can be used to allow to carry out learning phases specific to a given user (for example of personalised signature) through this simplified connection to an external computing unit (for example a mobile phone "smart-phone "or a tablet). A wired communication Scom2 can also be established with an industrial learning machine during the initial learning phase carried out during the production of the product. 16 ("Machine learning").

Thus, there must be this initial learning phase for the electronic device 1 using the principle of "Machine Learning", that is to say the position determination according to measurements of the signals oscillating through the propagation medium 2 made by a computer machine, which uses a non-regression algorithm. Digital measurement values from the electronic device 1 are therefore transmitted to the computer machine 16. Several distinct digital values are normally transmitted for different positions of an object on the measurement surface.

The initialisation phase is advantageously deported outside the device 10, in a powerful computer machine. The consumption of the measurement circuit can thus be reduced to the simple consumption of the neural network, the various synaptic weights being defined during the learning phase, then stored in a non-volatile memory of the measurement circuit 10. The measurement circuit 10 thus behaves like a filter that can be parametrized for any geometry of the matrix of floating electrodes (or of the propagation medium in the case of an alternative without electrodes). The determination of the exact position of the object, for example a finger, on the electrode array 2 is carried out by training the neural network by the computer machine to define positions in X and Y of the array on which is located the finger. The exact position of the finger is then determined by the neural network contained in the measurement circuit 10, in response to several measurement signals Sout digitised with the variations of each output signal taken into account according to the position of a finger on the array.

It should be noted that the computer machine can simply be a mobile phone 16 as shown with wireless communication of signals Scom with the electronic device 1 of the connected watch with touch-sensitive crystal. A communication, for example in the near field, can be established between the electronic device 1 and the mobile phone 16.

At the end of the learning phase, the data, such as synaptic parameters and weights of the neural network are memorized in the memory of the circuit 10 of the electronic device 1. Once parametrized with the synaptic weights determined during the learning phase, the electronic device 1 can easily determine the placement position of a finger on the array of electrodes 2 opposite the shape of each output signal Sout. A simplification of the position calculation is thus obtained in the measurement circuit 10 by determining after the learning phase the position without major consumption.

It should also be noted that in the concrete case of a capacitive touch device, the invention proposes to create a medium conducive to the propagation of oscillating electrical signals and in line with the above criteria by juxtaposing conductive electrodes 2 with low space requirement between each electrode, and isolated in the electrode array. All the electrodes define a detection area of the measurement surface. In this way, the oscillating signal can propagate from a conductive electrode 2 to its neighbours by the fringe capacitor effect. The presence of an object such as a finger above the measurement surface, at a small distance (typically the thickness of a non-conductive protective screen covering the electrodes), exerts on this array of electrodes 2 a combined effect of attenuation (by coupling to the ground) and of reinforcement (by increasing the permittivity of the fringe capacitance), which influences the transfer function of the oscillating signals between the different measurement and injection points, and this varies according to the position of the finger.

Figure 3:
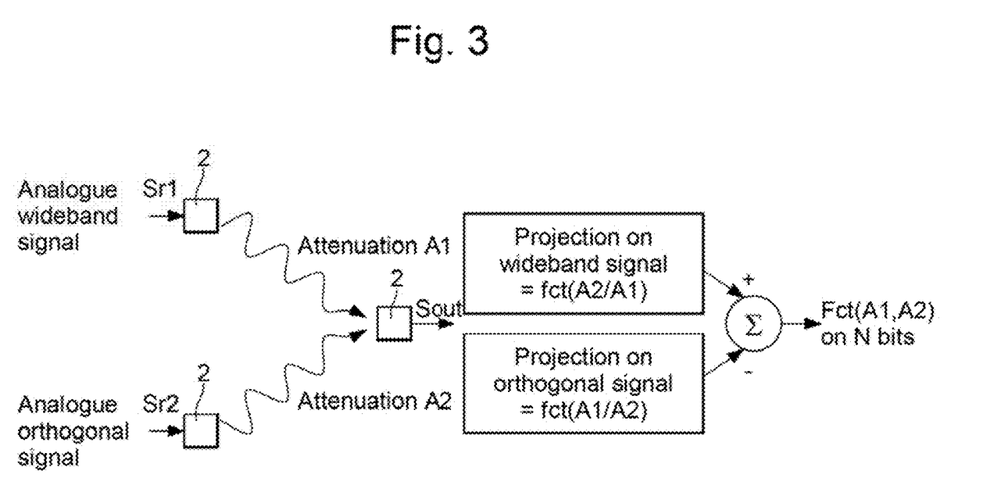
FIG. 3 shows a particular form of propagation of two orthogonal input signals for the method, measured at an output point in the propagation medium, depending on a transfer function of the modification of the signal to disturbance ratio relative to the location of the measurement point according to the invention.

FIG. 3 shows a particular form of propagation of two orthogonal input signals Sr1 and Sr2 for the method, which are measured at an output point Sout in the propagation medium. This measurement principle differs from what has been described with reference to FIG. 1 of the method for detecting the presence and/or determining the position of at least one object on or near a given measurement surface of the electronic device, because it is sought to obtain a certain robustness against variations in natural noise. There is therefore a first excitation signal Sr1, which is a broadband analogue signal, provided to a first electrode 2 of the array and a disturbance provided by a second electrode 2 of the array, spaced from the first electrode. This disturbance signal Sr2 is selected to be orthogonal to the excitation signal Sr1. Thereby, it is then possible to define a signal to disturbance ratio that is much more constant and defined relative to the variation of the natural noise, when the overall signal to noise ratio (SNR) is sufficiently greater than the limit of the electronic device. As shown in FIG. 3, there is a modification in the signal to disturbance ratio relative to the location of the measurement point.

As will be explained below in FIG. 8, the measurement output signal Sout is converted into a digital signal by an ADC converter. Then, a projection is made on the wideband signal to give the transfer function fct(A2/A1) where A1 is the attenuation of the excitation signal Sr1 and A2 is the attenuation of the orthogonal signal Sr2 at the measurement point. An influence of a finger placed in a detection area can be determined between the input Sr1 and the output Sout. A projection is also made on the orthogonal signal to give the transfer function fct(A1/A2). Subsequently, the two functions fct(A2/A1) and fct(A1/A2) are subtracted to give an output digital measurement signal of the measurement circuit Fct(A1, A2), which is on N bits and can be transmitted to the learning machine in an initial learning phase as previously described.

Figure 4:
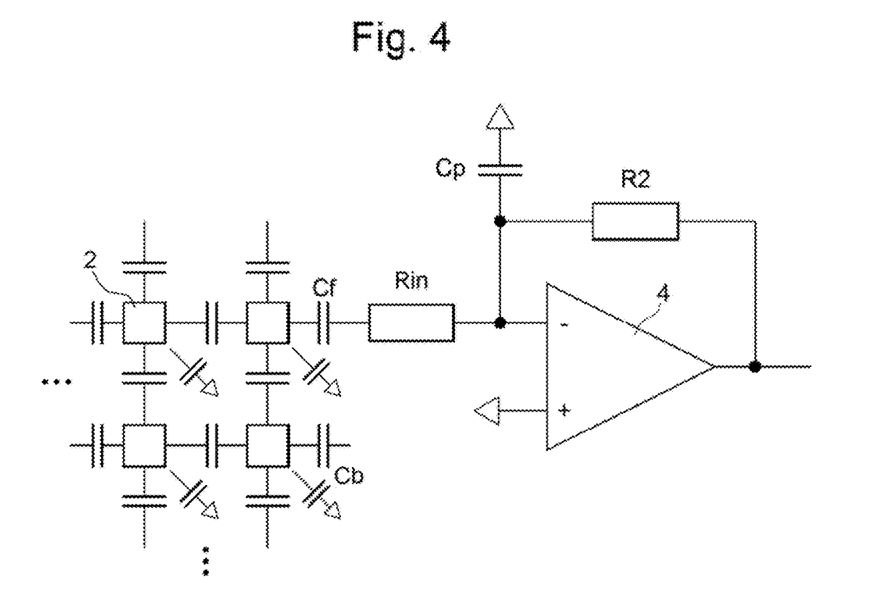
FIG. 4 shows a simple equivalent model of an array of capacitive sensor electrodes in matrix form defining the propagation medium with a measurement amplifier structure according to the invention.

FIG. 4 just shows a simple equivalent model of an array of capacitive sensor electrodes 2 in matrix form and which defines the propagation medium with a structure of a measurement amplifier 4 connected to the output of the array. An input resistor Rin is connected from the array to a negative terminal of the amplifier 4, while its positive input is linked to ground. A measuring resistor R2 connects the negative terminal of the amplifier 4 and its output. A parasitic capacitor Cp linked to ground remains at the connection node between the input resistance Rin and the measurement resistance R2.

The array of electrodes 2 called floating electrodes Cf, that is to say not connected, can be approached in simulation with an array of inter-capacitors arranged in the shape of a comb (fringe) with a matrix of capacitors to ground Cb. When this simple model is completed with the position of a finger, two main parameters are impacted. On the one hand, the electrode touched or approached by the finger obtains a greater capacitive value to ground, and on the other hand, the electrodes in direct proximity to the finger obtain a greater inter-capacitive value, due to the high Epsilon value of the finger tissue (water, Epsilon=80).

The resistance equivalent to the mass of the finger model is estimated in the range of Mega Ohms, but the actual situation is probably more complex. However, the two effects listed below obtain a complementary effect namely the increase of the capacitive value to ground reduces the coupling of the source to the measurement point and the increase of the marginal capacitors couples more signal from the source to the measurement point.

A large number of parameters characterise the structure of the array used. Account must be taken of the number of electrodes at least greater than 9 electrodes, for example 16, 20, 50, 100 or more electrodes, their shape and size less than 1 mm, of the distance separating them for example 50 µm or 35 µm or even less, of the distance to a given ground plane. Furthermore, it quickly becomes apparent that the input capacitor of the detection structure or preamplifier reduces the signal level. This is simply due to the capacitive divider structure between the teeth of the comb-shaped electrodes and the capacitive measurement value to ground. For this reason, an inverted 4 amplifier structure is used.

This structure of FIG. 4 has some advantages compared to another possible approach, which are listed below:

The high impedance array "sees" a resistance, which achieves a very low parasitic capacitive value to ground, especially when the discrete components are used to build the input detection amplifier.

The corresponding integrated structure allows to reduce the ESD protections and even deletes them on the input electrode.

The overall structure obtains a high-pass function.

Due to the very high impedance of the array (only the marginal capacitor in parallel with the grounding capacitor), the same input electrode can become the excitation electrode, by sending the excitation signal behind the series resistor.

As such, it should be noted that several electrode array structures in matrix form have been tested. It can be considered to produce the array of electrodes as shown in FIGS. 5, 6 and 7.

Figure 5:
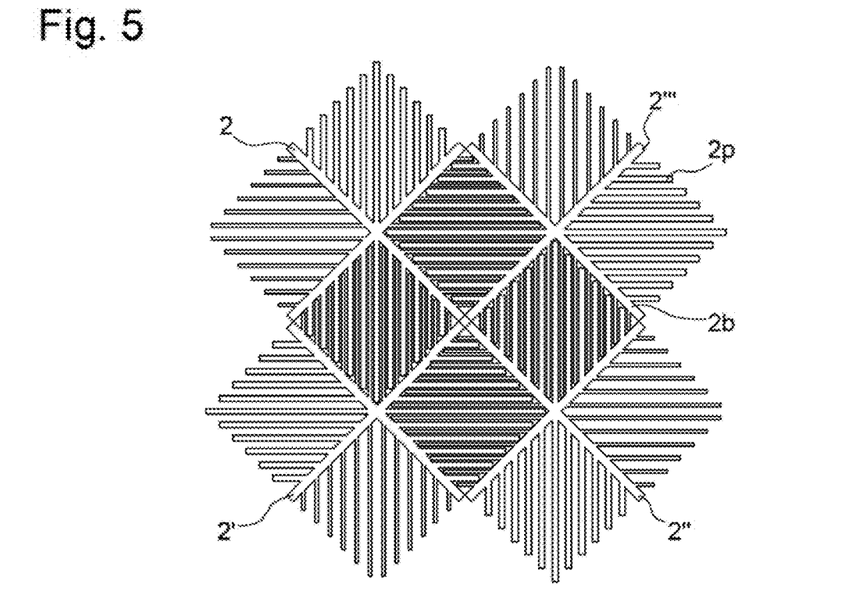
FIG. 5 shows a first embodiment of an array of capacitive sensor electrodes as a propagation medium, for which each electrode is of a comb structure so as to be partially interlocked with each neighbouring electrode according to the invention.

FIG. 5 shows a first embodiment of an array of capacitive sensor electrodes as a propagation medium, for which each electrode is of a comb-shaped structure to partially interlock with each neighbouring electrode. Therefore, only four electrodes 2, 2', 2", 2''' are shown, which each comprise an X-shaped or cross-shaped base 2b, and teeth 2p extending from the X-shaped base and dimensioned to form four small squares from each branch of the base 2b. The four small squares of teeth 2p with the base 2b form each square-shaped electrode. The teeth of each small square per electrode interlock with the teeth of another small square of a neighbouring electrode.

Of course, more than four electrodes are actually needed to produce the array of electrodes. This array of electrodes with a low fringe capacitive value leads to the highest signal variation dynamics relative to the position of a finger on the array. This is simply due to the fact that the finger-ground capacitive value dominates in the observed frequency range. In addition, the finger grounding effect (in a range of 1 pF) becomes much greater when the coupling fringe is reduced.

Figure 6:
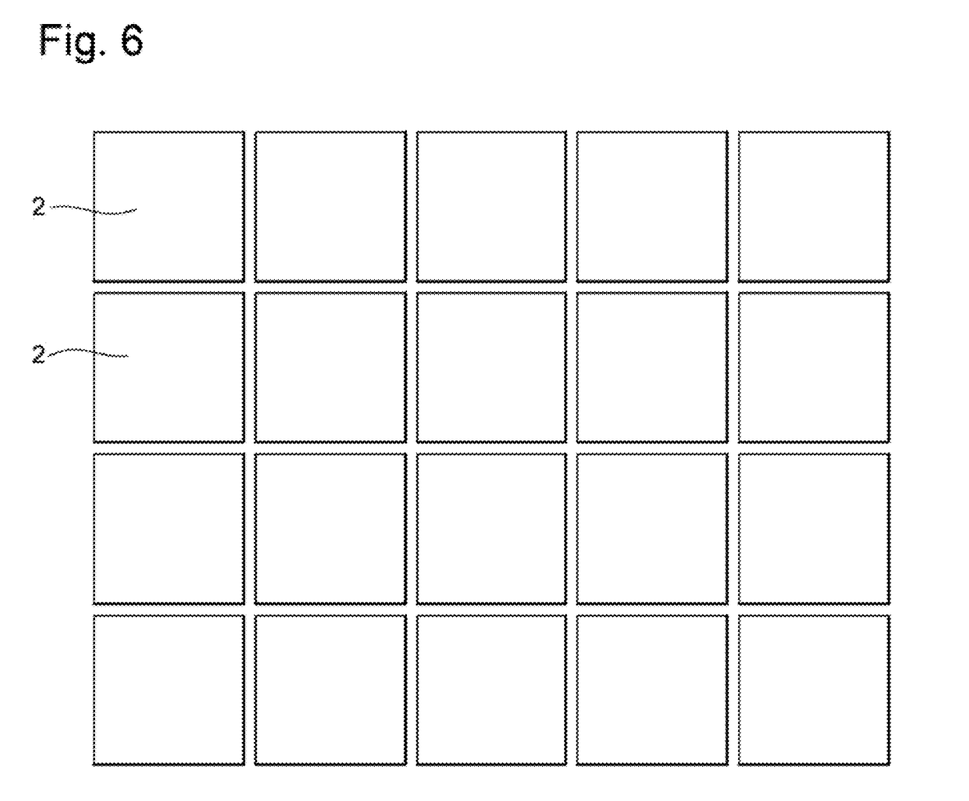
FIG. 6 shows a second embodiment of an array of capacitive sensor electrodes as a propagation medium, which consists of square-shaped electrodes according to the invention.
Figure 7:
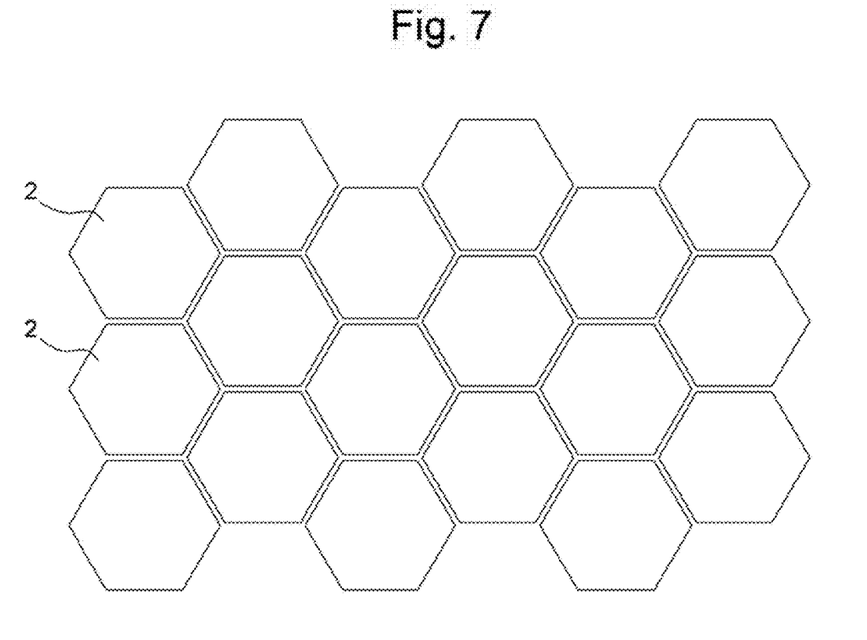
FIG. 7 shows a third embodiment of an array of capacitive sensor electrodes as a propagation medium, which consists of hexagonal-shaped electrodes according to the invention.

FIG. 6 shows a second embodiment of the capacitive array of electrodes. In this case, the array of electrodes is formed by a set of square-shaped electrodes 2 in matrix form. Of course, it is sought to reduce the space between each neighbouring electrode to define the array of electrodes 2 of the electronic device.

FIG. 7 shows a third embodiment of the capacitive array of electrodes. In this case, the array of electrodes is formed by a set of electrodes 2 which are of hexagonal shape and distributed as a honeycomb. Of course, it is sought to reduce the space between each neighbouring electrode to define the array of electrodes 2 of the electronic device.

Figure 8:
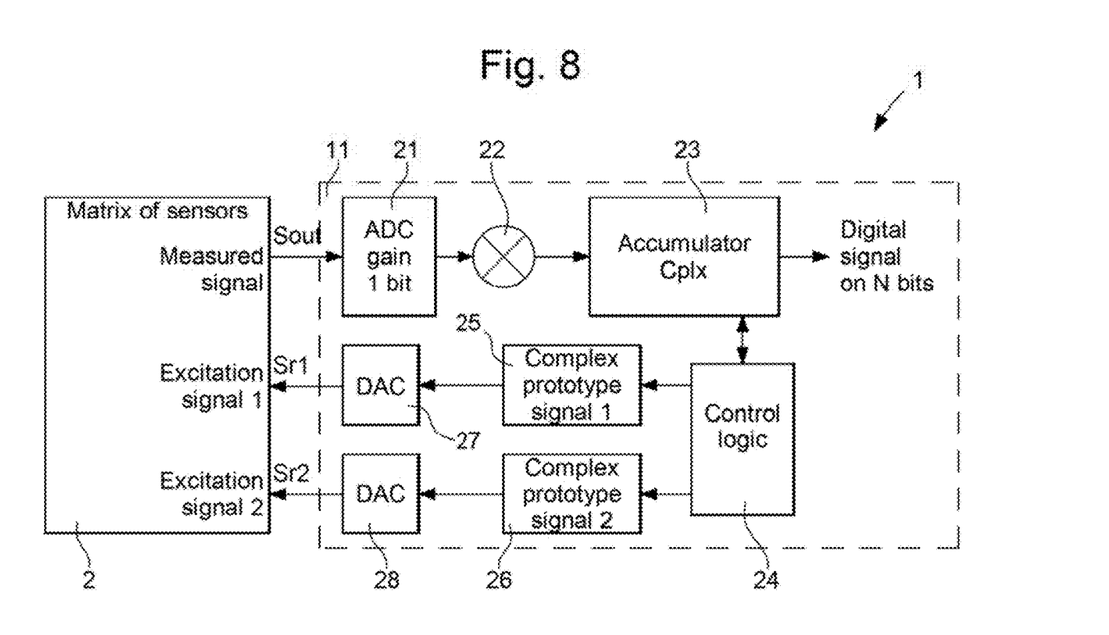
FIG. 8 shows an embodiment of a measurement and excitation device forming part of the measurement circuit connected to the array of electrodes provided partly for the measurement of the oscillating signals shown in FIG. 3.

FIG. 8 shows an embodiment of the electronic device 1 with the array of electrodes 2 (matrix of capacitive sensors) and the measurement circuit 10 provided in part for the measurement of the oscillating signals described above with reference to FIGS. 2 and 3. The array of electrodes 2 receives a first excitation signal Sr1 and a second orthogonal signal Sr2 each provided to a respective electrode 2. The array of electrodes 2 provides a measurement output signal Sout based on the variation of the oscillating signals depending on an object or finger placed on the measurement surface as explained previously.

In the measurement circuit 10, the output signal Sout is converted into a digital signal in an analogue-to-digital converter 21 with a gain on 1 bit for example. It is sought with the digital signal processing to obtain the lowest possible power dissipation during measurement, and to keep the analogue-to-digital converter 21 as simple as possible.

Following the digital conversion of the output signal Sout, a projection of the signal is carried out via a complex projection operator 22, which receives a digital signal from a unit 25 of the excitation signal prototype of the first excitation signal Sr1 into a digital signal. This simple projection approach indeed corresponds to a simple bandwidth filtering, when the excitation signal has a constant frequency. However, using a constant frequency is not recommended, as a disturbance with a frequency similar to the excitation signal may corrupt the measurement. For this reason, the frequency of the signal is swept during the measurement, which allows to get rid of the problem of fixed potential disturbance.

In the measurement circuit 10, the concept of projection is done on the fly and does not require any acquisition memory signal, and that a simple multiplier structure followed by an integrator is sufficient to provide the result of the projection. In order to achieve good robustness against phase variation, a complex signal projection by the complex projection operator 22 is used. The output of this complex projection operator 22 is received by a phase accumulator Cplx 23 (integrator), producing the real and imaginary parts of the digital projection signal.

It is each N-bit digital signal at the output of the accumulator 23 which is successively transmitted to a learning machine during the initial learning phase of the electronic device 1.

The accumulator 23 is also connected to a logic control unit 24, which can be a processor or rather a microcontroller wherein a memory can also be provided to store all the configuration parameters (synaptic weights) following the initial learning phase for example. All the complex values of the digitised output signals of the measurement circuit are used for the learning phase together with the associated positions XY and are archived on an external hard disk of a database (in order to prepare the learning phase).

The logic control unit 24 comprises a phase generator. This phase allows the generation of excitation and projection signals.

The control logic unit 24 sends the phase signal to a unit 25 of the excitation signal prototype of the first excitation signal Sr1 into a digital signal and a unit 26 of the excitation signal prototype of the second excitation signal Sr2 into a digital signal orthogonal to the first signal Sr1. The output of the unit 25 of the excitation signal prototype of the first excitation signal Sr1 is converted in a first digital-to-analogue converter DAC 27 to provide a first oscillating excitation signal Sr1 to the electrode array 2. The output of the unit 26 of the excitation signal prototype of the second excitation signal Sr2 is converted in a second digital-to-analogue converter DAC 28 to provide a second oscillating signal Sr2 orthogonal to the electrode array 2.

Figure 9:
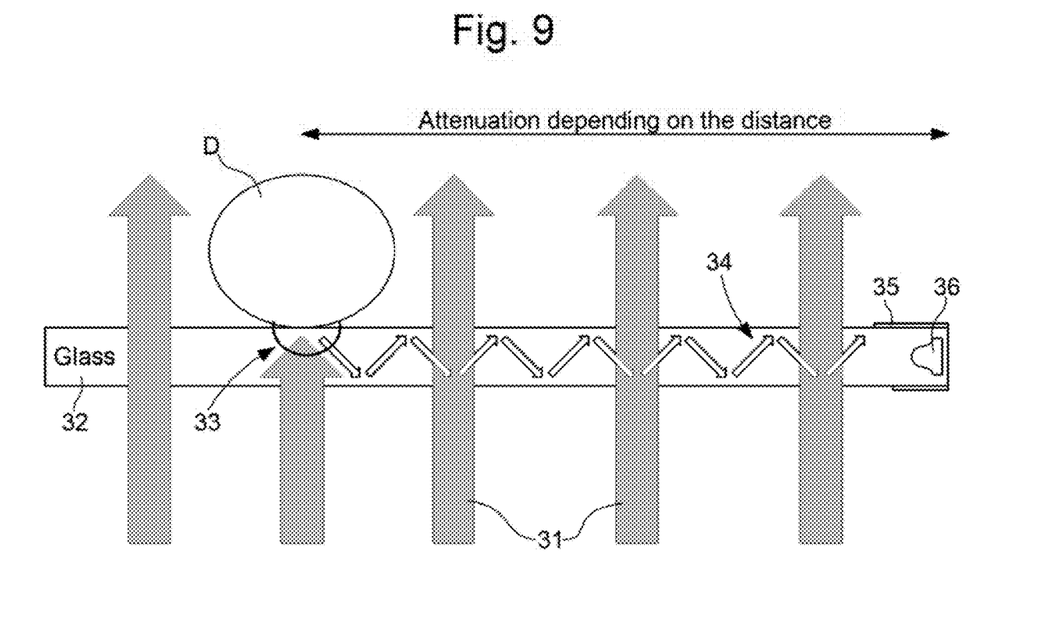
FIG. 9 shows a first embodiment of a part of an electronic device for determining the position of at least one object on a given measurement surface in a propagation medium such as a glass for the propagation of a light signal according to the invention.
Figure 10:
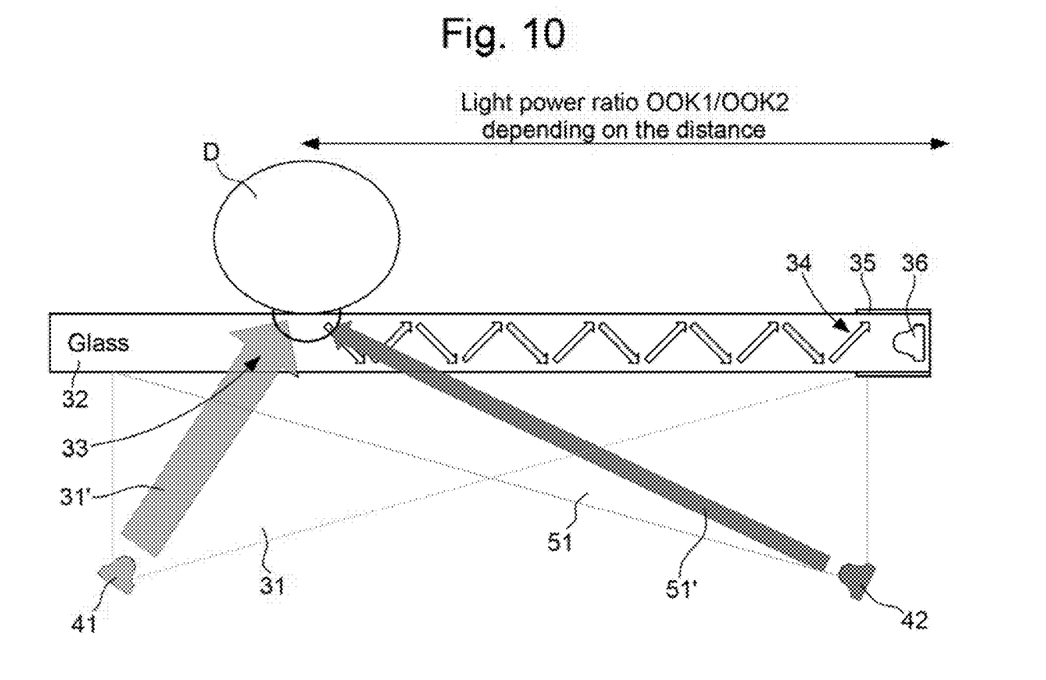
FIG. 10 shows a second embodiment of a part of an electronic device for determining the position of at least one object on a given measurement surface in a propagation medium such as a glass for the propagation of a light signal coming from two light sources according to the invention.
Figure 11:
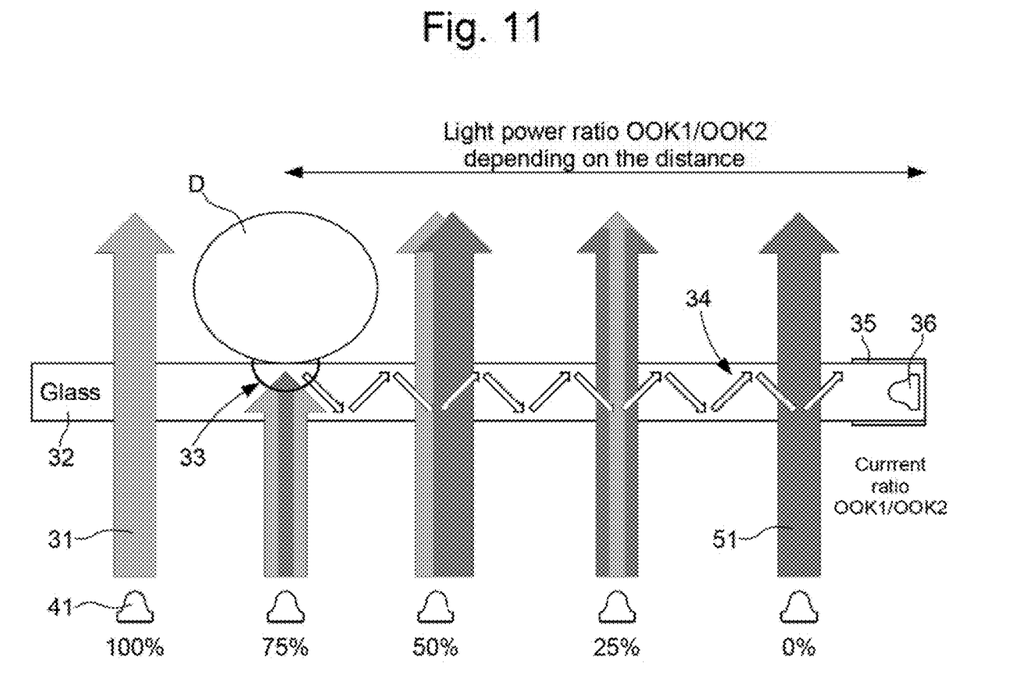
FIG. 11 shows a third embodiment of a part of an electronic device for determining the position of at least one object on a given measurement surface in a propagation medium such as a glass for the propagation of a light signal coming from a combination of beams from two light sources according to the invention.

As an alternative to an array of electrodes as propagation medium, FIGS. 9 to 11 show three embodiments partially showing an electronic device for determining at least one position of an object on a measurement surface where the propagation medium is adapted for the transmission of light signals (optical signals). The propagation medium is a glass 32 of a portable instrument, such as for example a watch glass. To determine the position of an object, such as a finger D on a measurement surface, the principle of attenuated total internal reflection in optics (FTIR or "Frustrated Total Internal Reflection") is used. This interesting optical property is generally used to internally cut the reflected light totally in an orthogonal direction. The reverse scenario allows to couple a few orthogonal lights in the glass to have a total attenuated internal reflection.

The electronic device also comprises one or more light sources 41, 42 for providing light beams 31, 51 directed towards a lower surface of the glass 32 opposite to the upper measurement surface on which is placed a finger D, whose position is to be determined. Once the finger D touches the measurement surface, there is an area of evanescent wave coupling of the light beams in the direction of the finger. After this, a light wave 34 is reflected between the lower surface and the upper surface of the glass 32 to be picked up by a photo-detector 36, which may be a photodiode, at one end or edge of the glass. One or two light screens 35 fixed on the lower and/or upper surfaces of the glass 32 are provided above and below the photodiode 36.

According to the first embodiment of FIG. 9, several light beams 31 are generated by one or more first light sources, not shown. These light beams 31 are directed perpendicular to the lower surface and to the upper surface. Depending on the position of the finger D on the measurement surface, there is an attenuation of the signal picked up by the photodiode, which depends on the distance between the finger D and photodiode 36. All position learning operations explained with reference to FIGS. 1 and 2 in particular apply to this optical variant of the electronic device.

According to the second embodiment of FIG. 10, provision is made of two light diodes 41, 42 which may be infrared diodes. The two infrared sources are modulated and used to illuminate the glass 32 with a given power gradient. The first infrared diode 41 provides a first light radiation 31 and is inclined at an angle defined relative to a perpendicular to the surfaces, and the same applies for the second infrared diode 42, which provides a second light radiation 51. The first beam 31' OOK1 arriving in the direction of the finger D is inclined differently from the second light beam 51' OOK2. Moving the finger along the axis X will more or less couple the first signal relative to the second signal at the photodiode 36, which detects. Thus, the distance-dependent light power ratio OOK1/OOK2 is determined.

Finally, according to the third embodiment of FIG. 11, two modulated infrared sources are used to illuminate the glass 32 with a given power gradient according to the first light beam 31 OOK1, and the second light beam 51 OOK2. Moving the finger D on the axis X will more or less couple the first signal relative to the second signal at the photodiode, which detects. Percentages of illumination or power gradient of each infrared diode are indicated in particular for the first infrared diode 41 (current ratio OOK1/OOK2). Thus, the light power ratio OOK1/OOK2 depending on the distance is determined.

Each electronic device for determining at least one position of an object on a measurement surface with a light signal transmission propagation medium, comprises a measurement circuit receiving an output signal from the photodiode 36 and controlling the light diode(s) 41, 42. For these three embodiments, the same initial phase of learning different positions of the object D on the measurement surface is carried out, as has been described previously with reference to FIGS. 1 and 2.

As indicated above, the determination of the position, for example, of a finger, placed on the measurement surface of the electronic device 1, can be used to control functions if the electronic device 1 is mounted in an electronic or electromechanical watch. It can also be considered to use the electronic device for the recognition of a signature by an object (stylus) or a person's finger, or the recognition of characters drawn on the measurement surface and found in a library of characters. As such, there must also be a learning phase for a signature or character recognition on the measurement surface by a computer machine in connection with the electronic device to determine the positions X and Y and also the time (important parameter for the signature). All these data are transmitted and memorized in the electronic device 1. This allows, within a determined time window, to perform a movement on the measurement surface with a stylus or a finger so that the electronic device 1 easily determines once configured, the signature or any drawn character.

From the description which has just been given, several variant embodiments of the method for detecting the presence and/or determining the position of at least one object on a measurement surface of an electronic device can be designed by a person skilled in the art without departing from the scope of the invention defined by the claims. The propagation medium can also be configured with an array of resistors on the measurement surface.

The invention claimed is:

1. A method for determining a position of an object on or near a measurement surface of an electronic device, which comprises an oscillating signal propagation medium and a measurement circuit, the method comprising:
    providing one or more oscillating signals at one or more input points which are different and spaced from a first part of the propagation medium in a detection area of the measurement surface,
    receiving one or more oscillating signals having passed through the propagation medium, which defines a transfer function of the oscillating signals, in one or more different output points spaced apart by a second part of the propagation medium in a detection area of the measurement surface,
    performing, in the measurement circuit, a measurement of a coupling or an attenuation induced by presence of an object placed on or near the measurement surface on one or more oscillating signals passing through the propagation medium; and
    determining a position of the object by applying a result of the measurement to a neural network trained with training data.

2. The method according to claim 1, wherein the neural network is trained during an initial learning phase, in which, different positions of a training object on or near the measurement surface is learned by a learning machine which receives various measurements relating to the different positions of the training object on or near the measurement surface,
    wherein after the initial learning phase, the determination of the exact positions in X and Y of the training object on or near the measurement surface is performed by the learning machine to define positions in X and Y of the different positions of the training object on or near the measurement surface, depending on the oscillating signals measured in the measurement circuit, and
    wherein different values X and Y of the different positions on the measurement surface are transmitted and memorized in a memory of the measurement circuit of the electronic device to parameterize and configure the electronic device to facilitate subsequent determination of the position of any object placed on or near the measurement surface.

3. The method according to claim 2, wherein the learning machine is provided external to the electronic device, and
    wherein the electronic device communicates the various measurements relating to the different positions of the training object on or near the measurement surface to the learning machine, which comprises the neural network.

4. The method according to claim 2, wherein the various measurements relating to the different positions of the object on or near the measurement surface are provided to the neural network provided in the measurement circuit,
    wherein the neural network is parameterized with synaptic weights determined by the learning machine used during the initial learning phase, and
    wherein any position or inclination of the object on the measurement surface is calculated at low power.

5. The method according to claim 2, wherein, in a subsequent learning phase, the learning machine is provided in a mobile phone with a program guiding user on different patterns to be performed on the measurement surface, and the mobile phone is configured to perform wireless communication of data signals with the electronic device, several successive digitized measurement signals of several positions of the training object on the measurement surface being transmitted to the mobile phone by near-field communication for determining the position values in X and Y transmitted by the mobile phone to the electronic device to be configured.

6. The method according to claim 2, wherein in the initial learning phase, any movement of the training object is determined in measurement signals transmitted by the electronic device,
  wherein the learning machine transmits after this initial learning phase all configuration parameters, which are synaptic weights to the electronic device relating to the different values in X and Y of the different positions and a time component for recognition of a signature or drawn characters,
  wherein the training object is one of a stylus or a person's finger on the measurement surface for a purpose of performing the signature within a defined time window or for recognition of characters drawn on the measurement surface.

7. The method according to claim 1, wherein an oscillating excitation signal is provided to an input point, among the one or more input points, of the first part of the propagation medium in the detection area of the measurement surface,
  wherein a plurality of output signals are received at different output points, among the one or more different output points, spaced from the second part of the propagation medium in the detection area of the measurement surface, and
  wherein the measurement circuit digitized all the output signals to determine the position of the object on the measurement surface or to be transmitted to a learning machine in an initial learning phase.

8. The method according to claim 1, wherein the electronic device comprises as propagation medium, an array of capacitive sensor electrodes, which comprises several electrodes disposed close to one another in matrix form, a major part of the capacitive electrodes being floating electrodes that are not connected by conductive tracks to the measurement circuit or to neighboring electrodes, while some electrodes at a periphery of the propagation medium are connected by conductive tracks to the measurement circuit,
  wherein at least two oscillating signals at the input are each provided to a respective input electrode at a periphery of the first part of the array of electrodes, the two electrodes receiving the oscillating input signals, being spaced from each other, and
  wherein an output measurement signal is received by an output electrode at a periphery of the second part of the electrode array, the input electrodes and the output electrode being disposed to cover an entire detection area of the measurement surface to determine the position of an object on the measurement surface.

9. The method according to claim 8, wherein a first analogue wideband oscillating signal is provided to a first input electrode and wherein a second analogue orthogonal oscillating signal is provided to a second electrode remote from the first electrode on the first part of the propagation medium.

10. The method according to claim 9, wherein a projection is made on the wideband signal in the measurement circuit to give the transfer function fct(A2/A1) where A1 is an attenuation of a first excitation signal and A2 is an attenuation of a second orthogonal signal at the measurement point, and wherein an influence of the object placed in the detection area is determined between the first electrode receiving the first excitation signal and the output electrode receiving the output measurement signal,
  wherein a projection is also made on the orthogonal signal to give the transfer function fct(A1/A2), and
  wherein the two functions fct(A2/A1) and fct(A1/A2) are subtracted to give an output digital measurement signal Fct(A1, A2) of the measurement circuit, which is on N bits.

11. An electronic device comprising:
  a measurement circuit connected to a propagation medium;
  a memory storing one or more instructions; and
  a processor configured to execute the one or more instructions to:
    provide one or more oscillating signals at one or more input points which are different and spaced from a first part of the propagation medium in a detection area of a measurement surface of the electronic device,
    receive one or more oscillating signals having passed through the propagation medium, which defines a transfer function of the oscillating signals, in one or more different output points spaced apart by a second part of the propagation medium in a detection area of the measurement surface,
    perform a measurement of a coupling or an attenuation induced by a presence of an object placed on or near the measurement surface on one or more oscillating signals passing through the propagation medium, and
    determine a position of the object by applying a result of the measurement to a neural network trained with training data.

12. The electronic device according to claim 11, wherein the oscillating signals comprises one of electrical signals, optical signals, ultrasonic signals or electromagnetic signals.

13. The electronic device according to claim 11, wherein the oscillating signals comprises signals created by mixing ultrasonic pressure waves and local electrical or optical features.

14. The electronic device according to claim 11, wherein the electronic device comprises the propagating medium for propagating light signals,
  wherein the propagation medium is a glass of a portable instrument,
  wherein for determining the position of the object, light beams from one or more different light sources are directed in the direction of a lower surface of the glass and an evanescent wave coupling area under the position of the object at an upper surface of the glass, and
  wherein a light wave is reflected between the lower surface and the upper surface of the glass to be picked up by a photo-detector at an edge of the glass.

15. The electronic device according to claim 14, wherein provision is made of at least two light diodes, which are modulated and used to illuminate the glass with a given power gradient, wherein a first light diode provides a first light beam inclined at an angle defined relative to a perpendicular to the surfaces, wherein a second light diode provides a second light beam inclined differently from the first light beam, and wherein the electronic device determines by the output of the photo-detector a light power ratio depending on a distance between the position of the object on the measurement surface and the photo-detector.

16. The electronic device according to claim 14, wherein provision is made of at least two light diodes, which are modulated and used to illuminate the glass with a given inverted power gradient, wherein a first light beam perpendicular to the glass is generated by a first light diode, wherein a second light beam perpendicular to the glass is generated by a second light diode, and wherein the electronic device determines by the output of the photo-detector a light power ratio depending on a distance between the position of the object on the measurement surface and the photo-detector.

17. The electronic device according to claim 11, wherein the propagation medium is an array of capacitive sensor electrodes, which comprises several electrodes disposed close to one another in matrix form, a major part of the capacitive electrodes being floating electrodes that are not connected by conductive tracks to the measurement circuit or to neighboring electrodes, while some electrodes at a periphery of the propagation medium are connected by conductive tracks to the measurement circuit, wherein two input electrodes at a periphery of the first part of the array of electrodes are each adapted to receive respectively one of two oscillating signals, the two input electrodes being spaced from each other, and wherein an output electrode at a periphery of the second part of the array of electrodes is adapted to receive an output measurement signal, the input electrodes and the output electrode being disposed to cover an entire detection area of the measurement surface to determine the position of an object on the measurement surface.

18. The electronic device according to claim 17, wherein the array of electrodes comprises electrodes having a comb-shaped structure to partially interlock with each neighboring electrode, wherein each electrode comprises an X-shaped base, and teeth extending from the X-shaped base and dimensioned to form four small squares from each branch of the base, and wherein the four small squares of teeth with the base form each square-shaped electrode allowing the teeth of each small square per electrode to interlock with teeth of another small square of a neighboring electrode.

19. The electronic device according to claim 17, wherein the array of electrodes comprises a set of square-shaped electrodes in matrix form with a reduced space between each electrode.

20. The electronic device according to claim 17, wherein the array of electrodes comprises a set of electrodes which are of hexagonal shape and distributed as a honeycomb with a reduced space between each electrode.

21. The electronic device according to claim 17, wherein the array of electrodes is arranged to receive a first excitation signal by a first electrode and a second orthogonal signal by a second electrode spaced from the first electrode, and to provide a measurement output signal to an output electrode based on variation of the oscillating signals depending on the object placed on the measurement surface, wherein a measurement and excitation device of the measurement circuit comprises an analogue-to-digital converter for converting the output signal into a digital signal, wherein the measurement circuit comprises a complex projection operator, which receives a digital signal from a unit of an excitation signal prototype of the first excitation signal into a digital signal to make a projection of the output signal converted into a digital signal, wherein the measurement and excitation device comprises a phase accumulator Cplx receiving the output signal from the complex projection operator, and which takes into account real and imaginary parts of the digitized projection signal, and wherein the phase accumulator Cplx provides an N-bit digital signal of the output measurement, which is intended to be transmitted for each position measurement to a learning machine during an initial learning phase of the electronic device.

22. The electronic device according to claim 21, wherein the accumulator is connected to a logic control unit, which comprises a generator of signals in a digital domain to control the unit of the excitation signal prototype of the first excitation signal into a digital signal and a unit of an excitation signal prototype of a second excitation signal into a digital signal orthogonal to the first signal, wherein the output of the unit of the excitation signal prototype of the first excitation signal is converted in a first digital-to-analogue converter to provide a first oscillating excitation signal to the electrode array, and wherein the output of the unit of the excitation signal prototype of the second excitation signal is converted in a second digital-to-analogue converter to provide a second oscillating signal orthogonal to the electrode array.

* * * * *

UNITED STATES PATENT AND TRADEMARK OFFICE
CERTIFICATE OF CORRECTION

PATENT NO. : 11,301,079 B2  
APPLICATION NO. : 16/950077  
DATED : April 12, 2022  
INVENTOR(S) : Pfeuti et al.

Page 1 of 1

It is certified that error appears in the above-identified patent and that said Letters Patent is hereby corrected as shown below:

In the Specification

Column 1, Prior Art, Line 25; Delete "users" and insert --user's-- therefor

Column 6, Brief Description of the Figures, Line 65; Delete "Sm," and insert --Srn,-- therefor

Column 7, Brief Description of the Figures, Line 12; Delete "Sm," and insert --Srn,-- therefor Column 7, Brief Description of the Figures, Line 23; Delete "Sm," and insert --Srn,-- therefor Column 7, Brief Description of the Figures, Line 29; Delete "Sm" and insert --Srn-- therefor Column 7, Brief Description of the Figures, Line 36; Delete "Sm" and insert --Srn-- therefor Signed and Sealed this  
Twelfth Day of July, 2022

Katherine Kelly Vidal  
*Director of the United States Patent and Trademark Office*